(12) United States Patent  (10) Patent No.: US 8,391,471 B2
Itou  (45) Date of Patent: Mar. 5, 2013

(54) ECHO SUPPRESSING APPARATUS, ECHO SUPPRESSING SYSTEM, ECHO SUPPRESSING METHOD AND RECORDING MEDIUM

(75) Inventor: Taisuke Itou, Osaka (JP)

(73) Assignee: Fujitsu Limited, Kawasaki (JP)

( * ) Notice: Subject to any disclaimer, the term of this patent is extended or adjusted under 35 U.S.C. 154(b) by 306 days.

(21) Appl. No.: 12/709,729

(22) Filed: Feb. 22, 2010

(65) Prior Publication Data

US 2010/0150376 A1    Jun. 17, 2010

Related U.S. Application Data

(63) Continuation of application No. PCT/JP2007/066470, filed on Aug. 24, 2007.

(51) Int. Cl.
*H04M 9/08* (2006.01)
(52) U.S. Cl. ......... 379/406.05; 379/388.07; 379/406.08; 370/289
(58) Field of Classification Search ..... 379/388.01–392, 379/406.01–406.16; 370/286–290
See application file for complete search history.

(56) References Cited

U.S. PATENT DOCUMENTS

| | | | | |
|---|---|---|---|---|
| 5,463,618 | A * | 10/1995 | Furukawa et al. | 370/290 |
| 5,479,502 | A * | 12/1995 | Ohga et al. | 379/406.08 |
| 5,539,731 | A * | 7/1996 | Haneda et al. | 370/286 |
| 5,668,794 | A * | 9/1997 | McCaslin et al. | 370/288 |
| 6,002,950 | A * | 12/1999 | Muraoka | 455/570 |
| 6,181,753 | B1 | 1/2001 | Takada | |
| 6,570,986 | B1 * | 5/2003 | Wu et al. | 379/406.09 |
| 6,961,422 | B2 * | 11/2005 | Boland | 379/406.05 |
| 7,139,342 | B1 * | 11/2006 | Phanse | 375/350 |
| 7,346,012 | B2 * | 3/2008 | Stopler | 370/286 |
| 7,386,142 | B2 * | 6/2008 | Kindred | 381/318 |
| 7,697,696 | B2 * | 4/2010 | Okumura | 381/66 |
| 2004/0252826 | A1 * | 12/2004 | Tian et al. | 379/406.08 |
| 2005/0129225 | A1 | 6/2005 | Piket | |

FOREIGN PATENT DOCUMENTS

| | | |
|---|---|---|
| EP | 0 880 260 A2 | 11/1998 |
| JP | 7-226793 | 8/1995 |
| JP | 10-304489 | 11/1998 |
| JP | 11-205199 | 7/1999 |
| JP | 11-331046 | 11/1999 |
| JP | 2002-84212 A1 | 3/2002 |

(Continued)

OTHER PUBLICATIONS

S. Furui; "Acoustics and Speech Processing, First Edition;" Kindai Kagaku Sha Co., Sep. 1992; pp. 84-85 (2 Sheets.)/p. 2.

(Continued)

*Primary Examiner* — Simon Sing
(74) *Attorney, Agent, or Firm* — Kratz, Quintos & Hanson, LLP

(57) ABSTRACT

An echo suppressing apparatus operable with a sound output device for outputting sound based on a reference signal and a sound processing device for processing an observed signal based on a received sound, the echo suppressing apparatus includes: an echo removal section for removing an echo component of the observed signal which is presumed on the basis of both the observed signal and the reference signal; a ratio calculation section for calculating a power ratio of the observed signal to the reference signal; a correction amount calculation section for calculating, based on the power ratio, a correction amount for the observed signal after removal; a correction section for correcting, based on the calculated correction amount, the observed signal after removal, so as to suppress a residual echo remaining in the observed signal after removal; and an output section for outputting the corrected observed signal to the sound processing device.

15 Claims, 16 Drawing Sheets

FOREIGN PATENT DOCUMENTS

| | | | |
|---|---|---|---|
| JP | 2002-207500 | A1 | 7/2002 |
| JP | 2002-237769 | A1 | 8/2002 |
| JP | 2003-284183 | A1 | 10/2003 |
| JP | 2005-250266 | A1 | 9/2005 |
| JP | 2007-519316 | A1 | 7/2007 |
| WO | WO 2005/060583 | A2 | 7/2005 |
| WO | WO 2006/049260 | A1 | 5/2006 |

OTHER PUBLICATIONS

International Search Report for International Application No. PCT/JP2007/066470 dated Nov. 16, 2007.

* cited by examiner

F I G. 3A
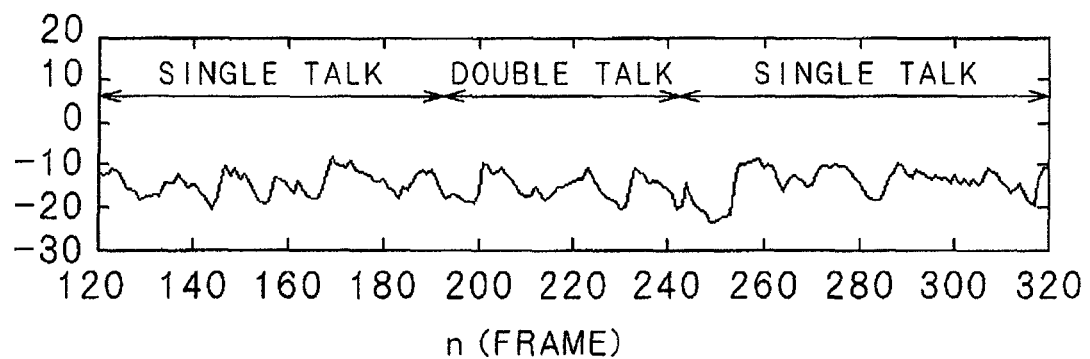
F I G. 3B
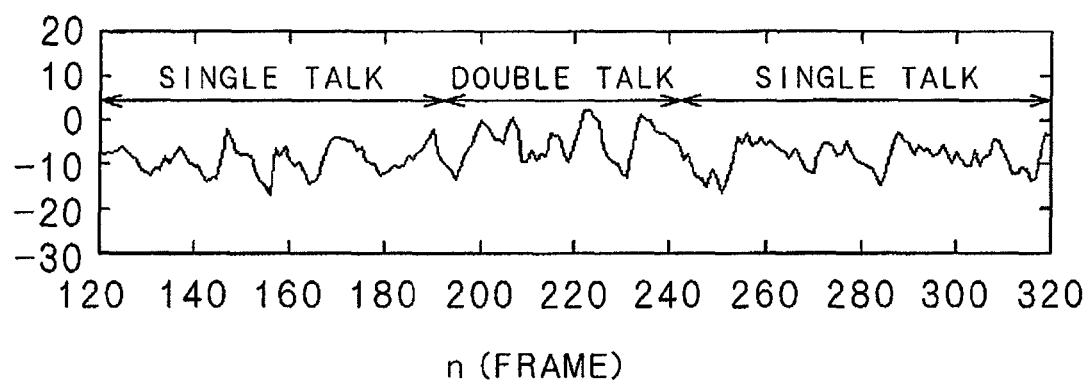

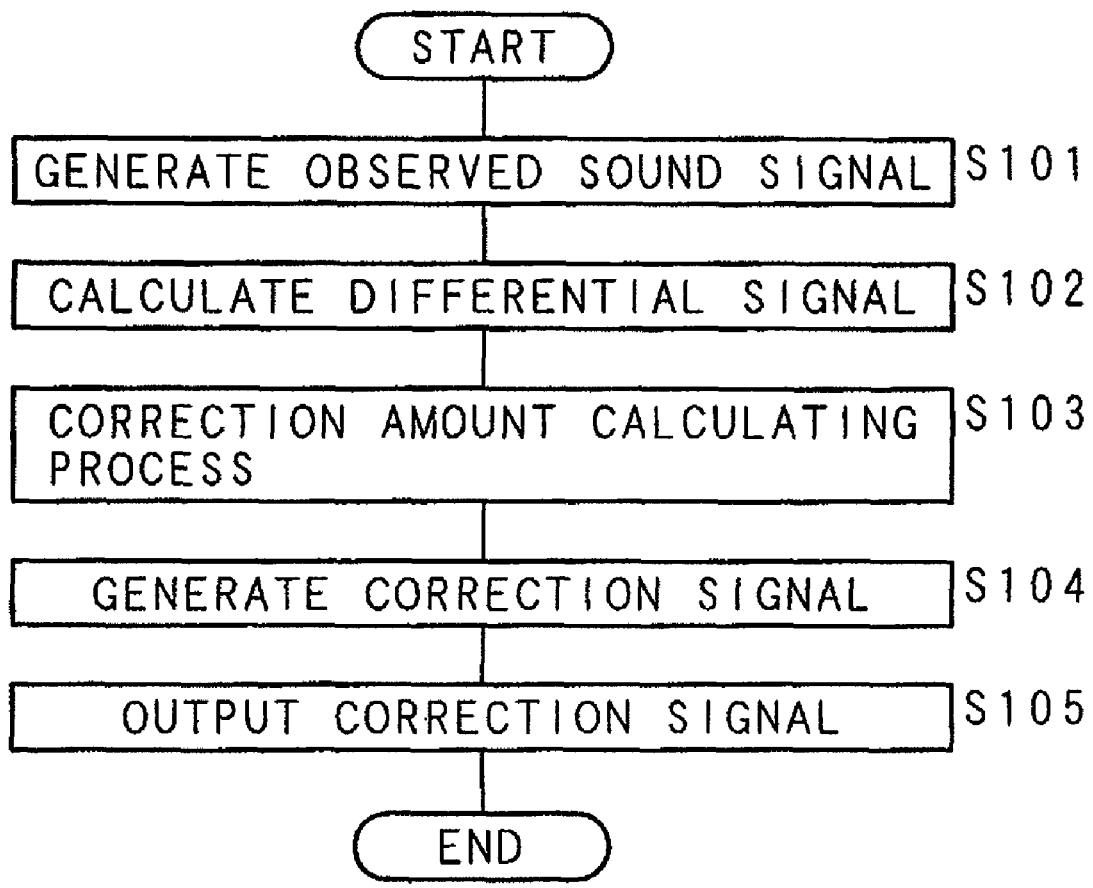

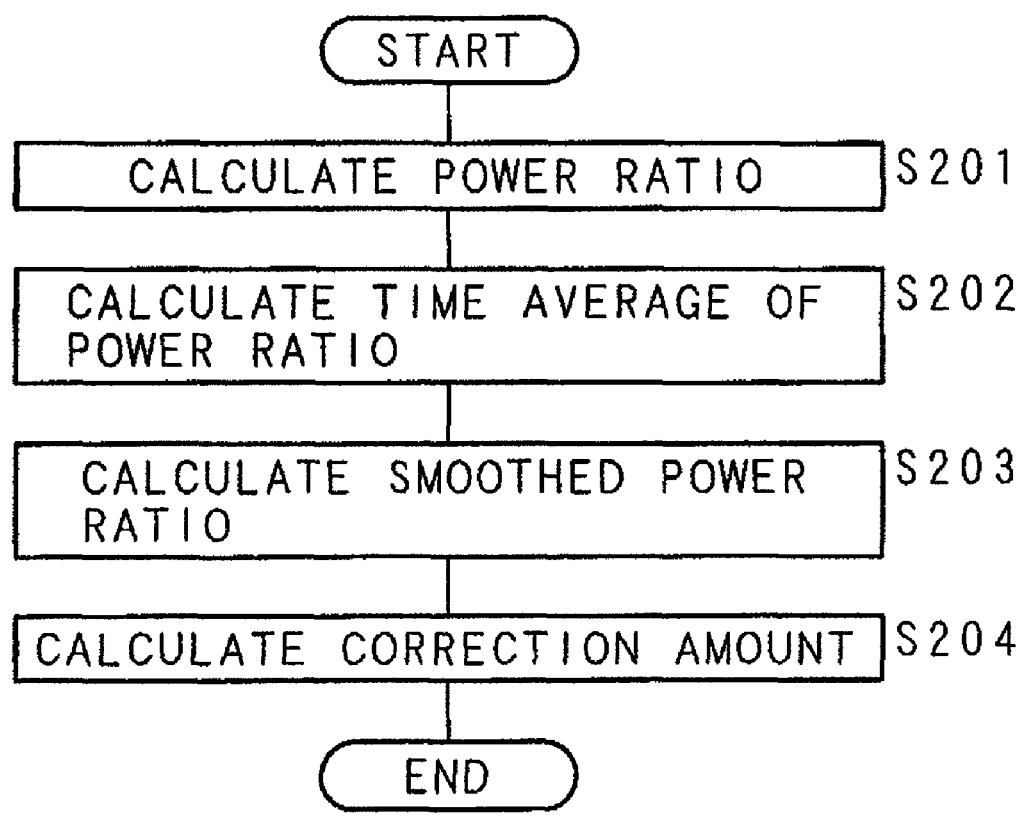

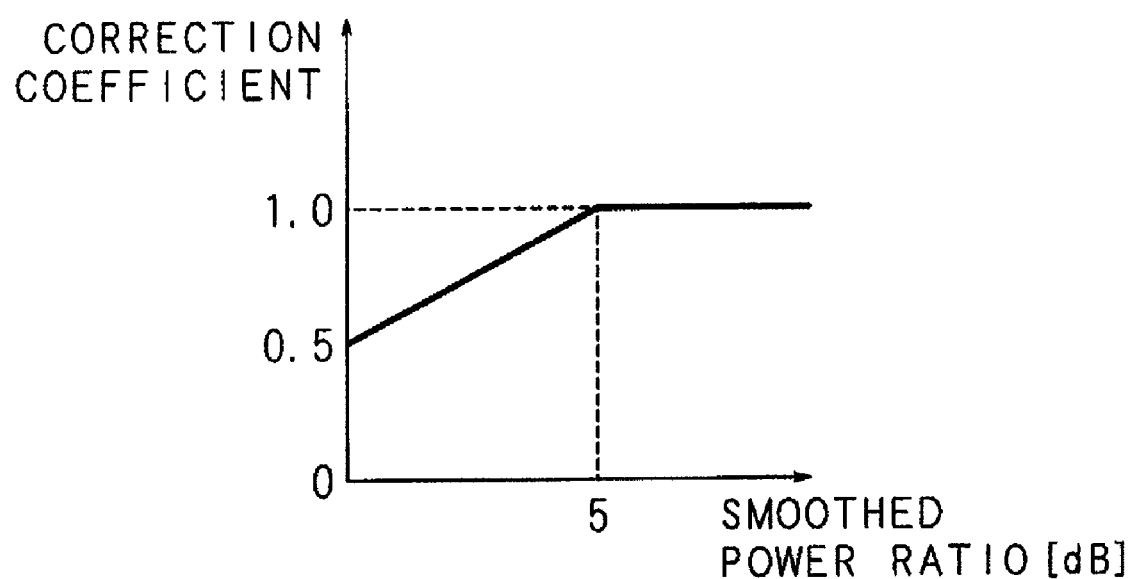
F I G. 1 2

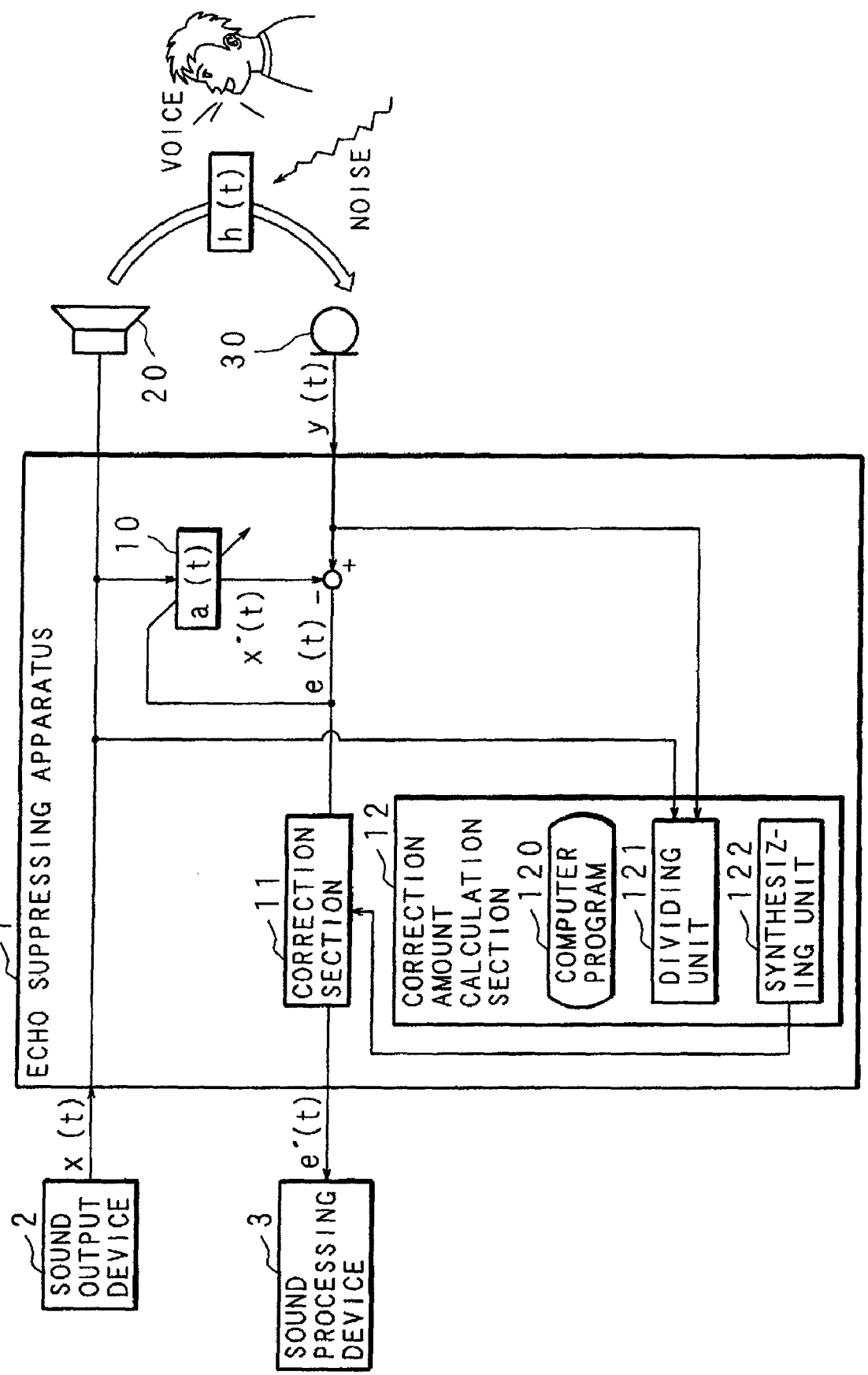

ECHO SUPPRESSING APPARATUS, ECHO SUPPRESSING SYSTEM, ECHO SUPPRESSING METHOD AND RECORDING MEDIUM

CROSS-REFERENCE TO RELATED APPLICATIONS

This application is a continuation, filed under U.S.C. §111 (a), of PCT International Application No. PCT/JP2007/066470 which has an international filing date of Aug. 24, 2007 and designated the United States of America.

FIELD

The embodiments discussed herein is related to an echo suppressing apparatus for suppressing an echo of an observed sound signal based on a sound received by a sound input section in cooperation with a sound output device for outputting a sound based on a sound signal from a sound output section and a sound processing device for processing a sound signal based on the sound received by the sound input section, an echo suppressing system including the echo suppressing apparatus, an echo suppressing method performed using the echo suppressing apparatus, and a recording medium recording a computer program for realizing the echo suppressing apparatus.

BACKGROUND

Non-patent document (Sadaoki Furui, September 1992, Acoustics and Speech Processing, First Edition: Kindai Kagaku sha Co. p 84-85) discloses an apparatus including a loud speaker and a microphone, such as a television conference system, a hands-free communication device, or a car navigation system with a sound outputting and sound recognizing functions, to have a function of an echo canceller which removes an echo based on the sound output by the loud speaker from the sound received by the microphone.

However, the conventional method such as the one disclosed in Non-patent document 1 has a problem with performance under the environment where, for example, music is playing. Specifically, when the echo canceling process is performed while music is being output from a loud speaker, a problem occurs that there is a high chance of the music remaining as a residual echo because of the performance limit of the adaptive filter. If voice recognition is performed while the music remains as a residual echo, the zone with the residual echo may be determined as a voice zone, resulting in a recognition error. Moreover, if the residual echo is included before or after the voice output by a speaker, the speech may incorrectly be recognized as other words.

To solve these problems involving false recognition, it is necessary to reduce the power of the residual echo as quickly as possible in a state called single talk where no speaker is talking, and to suppress only the echo while keeping the voice of a speaker in a state called double talk where a speaker is talking.

SUMMARY

According to an aspect of the embodiments, an echo suppressing apparatus operable with a sound output device for outputting sound based on a reference sound signal and a sound processing device for processing an observed sound signal based on a received sound, the echo suppressing apparatus includes: an echo removal section for presuming an echo component of the observed sound signal on the basis of both the observed sound signal and the reference sound signal, and removing the echo component from the observed sound signal; a ratio calculation section for calculating a power ratio of the observed sound signal to the reference sound signal; a correction amount calculation section for calculating, based on with the calculated power ratio, a correction amount for the observed sound signal from which the echo component is removed; a correction section for correcting, based on the calculated correction amount, the observed sound signal from which the echo component is removed, so as to suppress a residual echo remaining in the observed sound signal from which the echo component is removed; and an output section for outputting the corrected observed sound signal to the sound processing device.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

BRIEF DESCRIPTION OF THE DRAWINGS

FIGS. 3A to 3B depict graphic charts illustrating examples of changes in data used in the correction amount calculating process performed by the echo suppressing apparatus according to Embodiment 1.

FIG. 9 is an operation chart illustrating an example of the signal correcting process performed by the echo suppressing apparatus according to Embodiment 1.

FIG. 10 is an operation chart illustrating an example of the correction amount calculating process performed by the echo suppressing apparatus according to Embodiment 1.

FIG. 12 is a graphic chart illustrating an example of the relationship between the smoothed power ratio and the correction coefficient for correcting a spectrum in the echo suppressing apparatus according to Embodiment 2.

FIG. 16 is a schematic diagram illustrating an example of the echo suppressing apparatus according to Embodiment 4.

DESCRIPTION OF EMBODIMENTS

Embodiment 1

Figure 1:
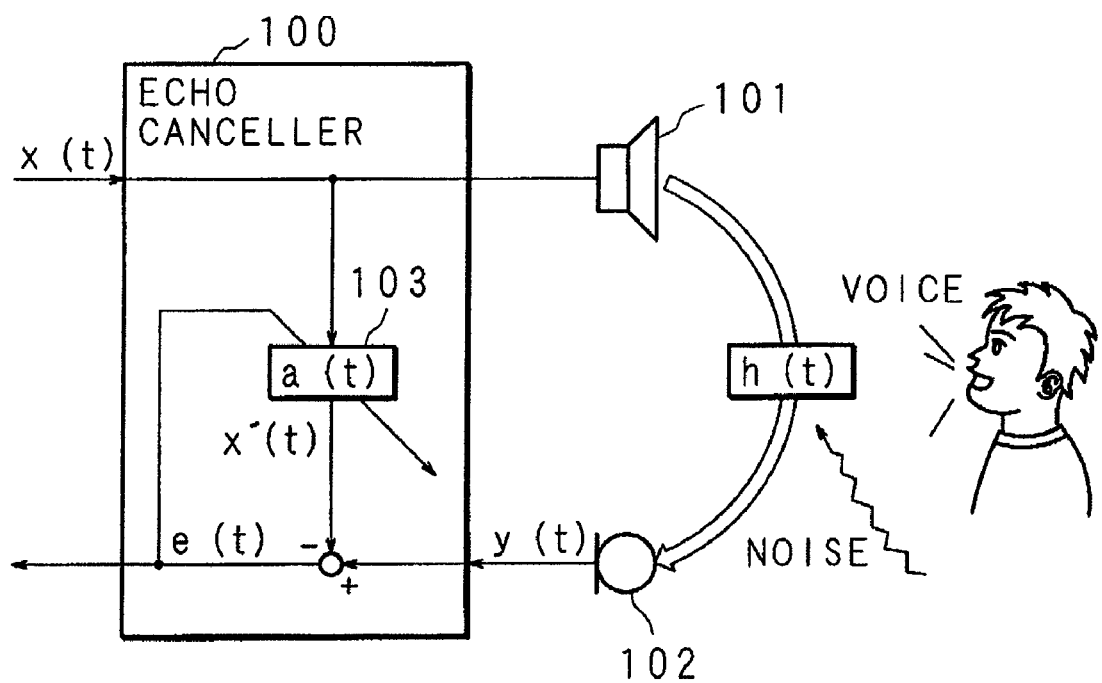
FIG. 1 is a schematic diagram illustrating an example of the conventional echo canceller.

FIG. 1 is a schematic diagram illustrating an example of a conventional echo canceller. In FIG. 1, the echo canceller is denoted by 100, the echo canceller 100 including a loud speaker 101 outputting a sound based on a reference sound signal x(t), and a microphone 102 generating an observed sound signal y(t) based on the received sound. Moreover, the echo canceller 100 includes an adaptive filter 103 used for removal of an echo from the observed sound signal y(t).

The microphone 102 receives not only a sound to be received such as a sound of a speaker's voice, but also various sounds such as a sound output from the loud speaker 101, other noise and the like. More specifically, the sound output from the loud speaker 101 based on the reference sound signal x(t) passes through the acoustic field in the external environment to be received by the microphone 102. If the impulse response between the loud speaker 101 and the microphone 102 is defined as h(t), the presumed value a(t) for h(t) is obtained at the adaptive filter 103 so as to derive x'(t) from the reference sound signal x(t) passing through the adaptive filter with a(t). The presumed value a(t) is obtained using a method such as the steepest descent method, Least Mean Square (LMS), the learning identification method or the like. An echo based on the output of the loud speaker 101 is removed by subtracting x'(t) from the observed sound signal y(t), deriving a differential signal e(t). The presumption is performed by making the adaptive filter 103 operate such that the electric power of the differential signal e(t) becomes minimum when the signal included in y(t) is only a residual echo based on the output of the loud speaker 101 (see Non-patent document 1 for example).

Figure 2:
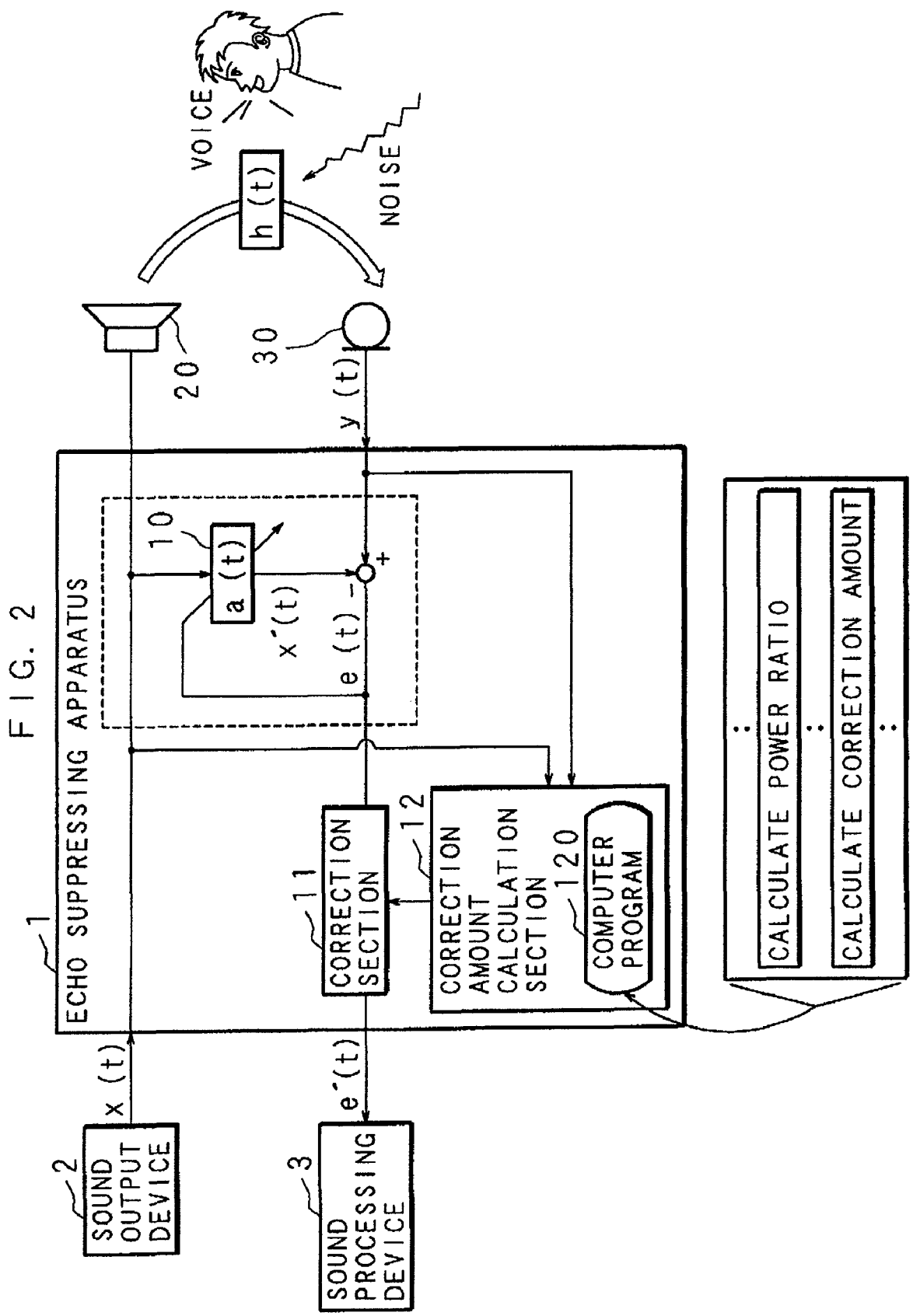
FIG. 2 is a schematic diagram illustrating an example of an echo suppressing apparatus according to Embodiment 1.

FIG. 2 is a schematic diagram illustrating an example of an echo suppressing apparatus according to Embodiment 1. The reference number 1 in FIG. 2 represents an echo suppressing apparatus using a computer such as, for example, a television conference system, a car navigation system mounted on a vehicle or the like. The echo suppressing apparatus 1 operates in cooperation with a sound output device 2 such as an audio system or the like and a sound processing device 3 such as a voice recognition system or the like. The output sound signal output from the sound output device 2 is output as a sound from a sound output section 20 such as a loud speaker or the like. Moreover, a sound input section 30 such as a condenser microphone or the like receives an external sound, generates an input sound signal based on the received sound, and outputs it to the sound processing device 3. The echo suppressing apparatus 1 is provided with the function of an echo canceller which removes an echo based on the sound output by the sound output section 20 from the sound received by the sound input section 30. It is noted that, in the description below, the output sound signal in the echo suppressing apparatus 1 is specifically referred to as a reference sound signal, while the input sound signal is specifically referred to as an observed sound signal.

The echo suppressing apparatus 1 further includes an adaptive filter 10 used for removing an echo from the observed sound signal, a correction section 11 for correcting a signal so as to remove a residual echo that has not been removed by the adaptive filter 10, and a correction amount calculation section 12 for calculating a correction amount corrected by the correction section 11. Note that the part indicated by the dotted line in FIG. 2 corresponds to the echo canceller described in the background art. Though the present embodiment illustrates an example where the adaptive filter 10 is used as an echo canceller, the present embodiment is not limited thereto. A known method other than the adaptive filter 10 may also be used to remove an echo from the observed sound signal such as a method of converting the reference sound signal and the observed sound signal into a signal on a frequency axis by FFT (Fast Fourier Transform) or the like to remove an echo in a frequency domain.

The correction amount calculation section 12 includes a storage circuit such as a memory storing a computer program 120 as a firmware and a control circuit such as an MPU (Micro Processing Unit) performing various controls and operations, to execute the computer program 120 stored in the storage circuit at the control circuit and to perform various operations, so that a computer functions as the echo suppressing apparatus 1 of the present embodiment. It is noted that, though the storage circuit and the control circuit are used for convenience to execute the computer program 120 in the description, it is also possible to design a dedicated operation circuit such as VLSI (Very Large Scale Integration) or the like as hardware instead of executing the computer program 120 as a firmware.

If the echo suppressing apparatus 1 is, for example, a navigation system with a voice recognizing function, the sound processing device 3 executes a sound recognition process based on the corrected observed sound signal.

Next, the signal processing performed by the echo suppressing device 1 according to Embodiment 1 of the present embodiment is described with reference to FIG. 2. The reference sound signal output from the sound output device 2 to output a sound such as music from the sound output section 20 is indicated as a reference sound signal x(t) with a sampling number t, while the observed sound signal based on the sound received by the sound input section 30 such as a speaker's voice is indicated as an observed sound signal y(t) with the sampling number t. The sampling number t is a number used for identifying each sample when a sound of analog signals is converted into digital signals at a sampling frequency in a range between 8000 and 16000 Hz. The reference sound signal x(t) and the observed sound signal y(t) with the same output and input timings are provided with the same sampling number t.

The sound input section 30 receives not only a sound to be received such as a speaker's voice, but also various sounds such as music output from the sound output section 20, other noise and the like. More specifically, the sound output from the sound output section 20 based on the reference sound signal x(t) passes through the acoustic field in the external environment to be received by the sound input section 30. If the impulse response between the sound output section 20 and the sound input section 30 is defined as h(t), its presumed value a(t) is obtained at the adaptive filter 10 so as to derive x'(t) from the reference sound signal x(t) passing through the adaptive filter 10 with the presumed value a(t). Then, x'(t) is subtracted from the observed sound signal y(t) to calculate a differential signal e(t) from which an echo based on the output of the sound output section 20 is removed. It is noted that the presumption is made by causing the adaptive filter 10 operate such that the power of the differential signal e(t) becomes minimum when the signal included in the observed sound signal y(t) is only the echo based on the output of the sound output section 20.

Moreover, the correction amount calculation section 12 receives the reference sound signal x(t) and the observed sound signal y(t), calculates the power ratio of the observed sound signal y(t) to the reference sound signal x(t), calculates the correction amount for the observed sound signal y(t) in accordance with the calculated power ratio, specifically here the correction amount for the differential signal e(t) which is the observed sound signal after echo removal by the adaptive filter 10, and outputs the calculated correction amount to the correction section 11.

The correction section 11 receives the correction amount from the correction amount calculation section 12 to output, based on the received correction amount, a correction signal e'(t) obtained by correcting the differential signal e(t) which is the observed sound signal after echo removal by the adaptive filter 10, to the sound processing device 3.

Next, the method of calculating the correction amount will more specifically be described. The correction amount calculation section 12 receives the reference sound signal x(t) and the observed sound signal y(t), and calculates the logarithmic power for frames, each frame including several hundred samples of the received reference sound signal x(t) or observed sound signal y(t). It is noted that a frame number n is used to indicate the logarithmic power of the frame related to the reference sound signal x(t) as powX(n) and to indicate the logarithmic power of the frame related to the observed sound signal y(t) as powY(n). The power here represents, for example, a frame power indicated as an integral value of the power spectrum of a sound signal included in a frame, while the logarithmic power means the common logarithm of the frame power. It is noted that, the power may appropriately be defined as a value such as a square value of the amplitude of a sound signal included in a frame.

FIGS. 3A to 3B depict graphic charts illustrating examples of changes in data used in the correction amount calculating process performed by the echo suppressing apparatus 1 according to Embodiment 1. FIG. 3A is a graph illustrating changes of the logarithmic power powX(n) of the reference sound signal x(t) for each frame, representing changes in the logarithmic power by the dB unit with the horizontal axis indicating frame numbers (n) as an indicator for time. FIG. 3B is a graph illustrating changes of the logarithmic power powY (n) of the observed sound signal y(t) for each frame, representing changes in the logarithmic power by the dB (deciBel) unit with the horizontal axis indicating frame numbers (n) as an indicator for time. In FIGS. 3A to 3B, the zone where no speaker is talking is indicated as single talk, while the zone where a speaker is talking is indicated as double talk. As illustrated in FIGS. 3A to 3B, since the reference sound signal x(t) has a relatively large effect on the observed sound signal y(t) in the single talk zone, the logarithmic power powX(n) of the reference sound signal x(t) and the logarithmic power powY(n) of the observed sound signal y(t) represent similar waveforms of changes. However, in the double talk zone, a sound such as a speaker's voice or the like exists, which has an effect only on the side of the observed sound signal y(t), so that the logarithmic power powX(n) of the reference sound signal x(t) takes a waveform of changes which is different from that of the logarithmic power powY(n) of the observed sound signal y(t).

Figure 4:
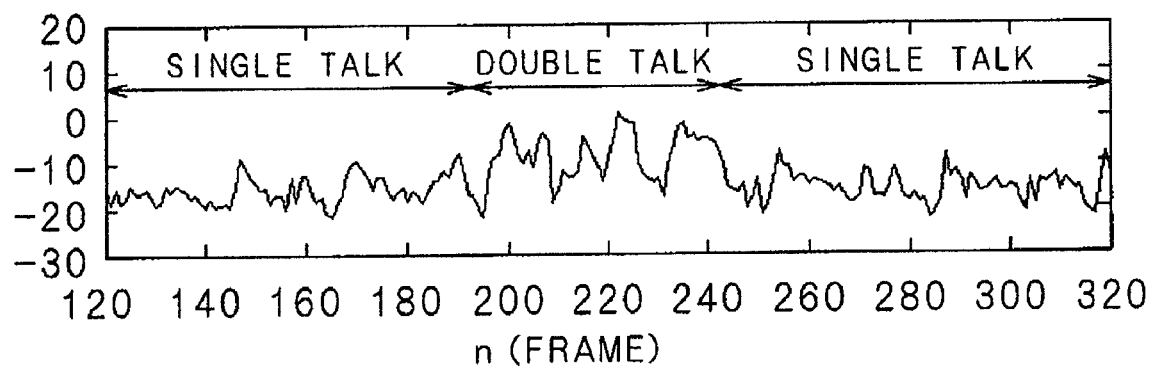
FIG. 4 is a graphic chart illustrating an example of changes in data used in the correction amount calculating process performed by the echo suppressing apparatus according to Embodiment 1.

FIG. 4 is a graphic chart illustrating an example of changes in data used in the correction amount calculating process performed by the echo suppressing apparatus 1 according to Embodiment 1. FIG. 4 is a graph illustrating changes, for each frame, of the logarithmic power powE(n) of the differential signal e(t) obtained by subtracting x'(t) from the observed sound signal y(t), representing changes in the logarithmic power by the dB unit with the horizontal axis indicating frame numbers (n) as an indicator for time. As illustrated in FIG. 4, the logarithmic power powE(n) of the differential signal e(t) from which an echo is removed by the function of the adaptive filter 10 represents a waveform with dynamic changes both in the single talk zone and the double talk zone. According to the present embodiment, in view of the fact that the logarithmic power powX(n) of the reference sound signal x(t) has a waveform of changes similar to that of the logarithmic power powY(n) of the observed sound signal y(t), the differential signal e(t) is corrected based on the result obtained by subtracting the logarithmic power powX(n) of the reference sound signal x(t) from the logarithmic power powY(n) of the observed sound signal y(t) so as to reduce the power of the differential signal e(t) in the single talk zone as quickly as possible for echo removal.

Figure 5:
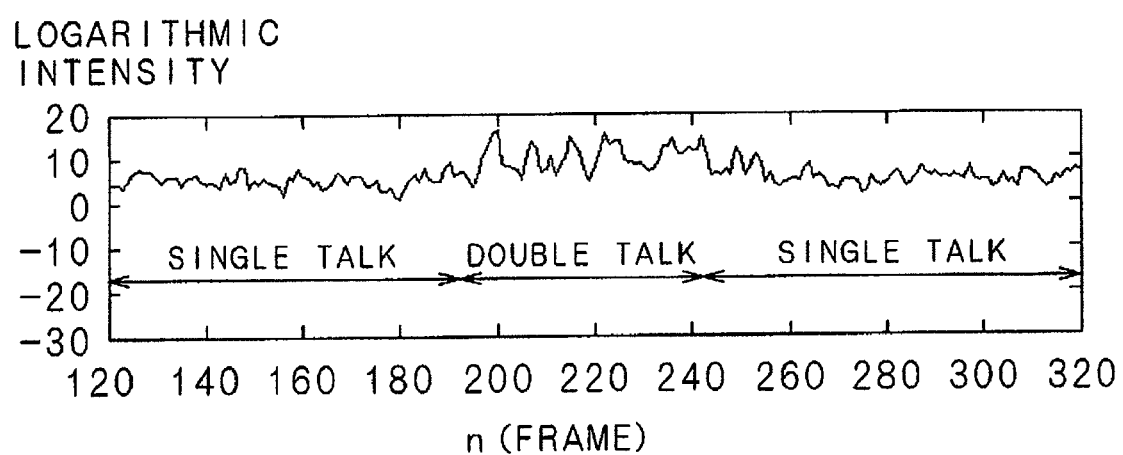
FIG. 5 is a graphic chart illustrating an example of changes in data used in the correction amount calculating process performed by the echo suppressing apparatus according to Embodiment 1.

FIG. 5 is a graphic chart illustrating an example of changes in data used in the correction amount calculating process performed by the echo suppressing apparatus 1 according to Embodiment 1. FIG. 5 is a graph illustrating changes, for each frame, of the value {powY(n)−powX(n)} obtained by subtracting the logarithmic power powX(n) of the reference sound signal x(t) from the logarithmic power powY(n) of the observed sound signal y(t), representing changes in the logarithmic power by the dB unit with the horizontal axis indicating frame numbers (n) as an indicator for time. The difference between the logarithmic power powY(n) of the observed sound signal y(t) and the logarithmic power powX(n) of the reference sound signal x(t) indicates the quotient obtained by dividing the power of the observed sound signal y(t) by the power of the reference sound signal x(t), that is, the power ratio of the observed sound signal y(t) to the reference sound signal x(t). In the description below, the difference between the logarithmic power powY(n) of the observed sound signal y(t) and the logarithmic power powX(n) of the reference sound signal x(t) for each frame n is referred to as a power ratio {powY(n)−powX(n)}. As illustrated in FIG. 5, changes in the power ratio {powY(n)−powX(n)} are more dynamic in the double talk zone compared to those in the single talk zone, presenting a clear difference between changes in the single talk zone and changes in the double talk zone. As illustrated in FIG. 5, the correction amount calculation section 12 calculates the power ratio of the observed sound signal y(t) to the reference sound signal x(t).

As described above, the power ratio {powY(n)−powX(n)} in the single talk zone has smaller changes and takes a smaller value compared to that in the double talk zone, presenting a clear difference between the single talk zone and the double talk zone. Thus, an effect of the reference sound signal x(t) may be eliminated by correcting the differential signal e(t) based on the power ratio {powY(n)−powX(n)}. In the present embodiment, an effect caused by moderate time variations in the reference sound signal x(t) is further eliminated to define the difference between the single talk zone and the double talk zone.

For a method of smoothing changes of the power ratio {powY(n)−powX(n)} in the single talk zone by eliminating the effect caused by moderate time variations in the reference sound signal x(t), the correction amount calculation section 12 performs calculation using the following formula 1.

$$subYX(n) = \alpha \times subYX(n-1) + (1-\alpha) \times \{powY(n) - powX(n)\} \quad \text{formula 1}$$

In the formula 1, subYX(n) is a time average of the power ratio {powY(n)−powX(n)}, whereas α is the time constant in calculating the time average. For the time constant α, a numerical value such as 0.95 (provided 0<α<1) is used.

Figure 6A:
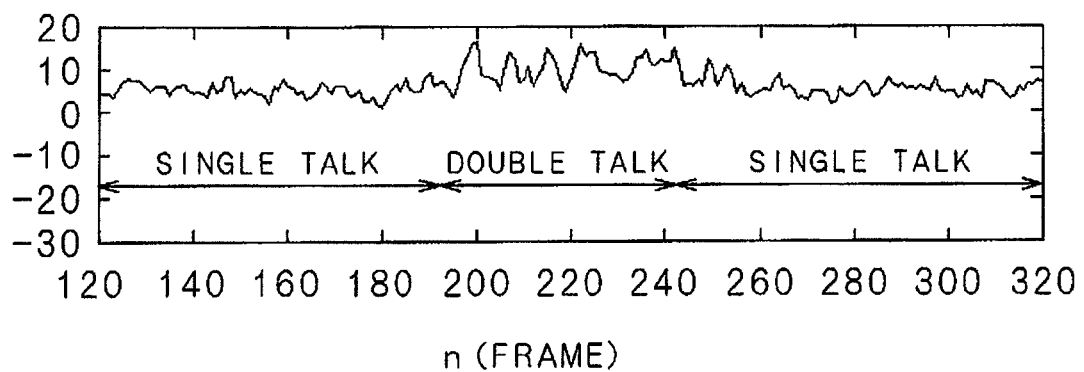
FIGS. 6A to 6C depict graphic charts illustrating examples of changes in data used in the correction amount calculating process performed by the echo suppressing apparatus according to Embodiment 1.
Figure 6B:
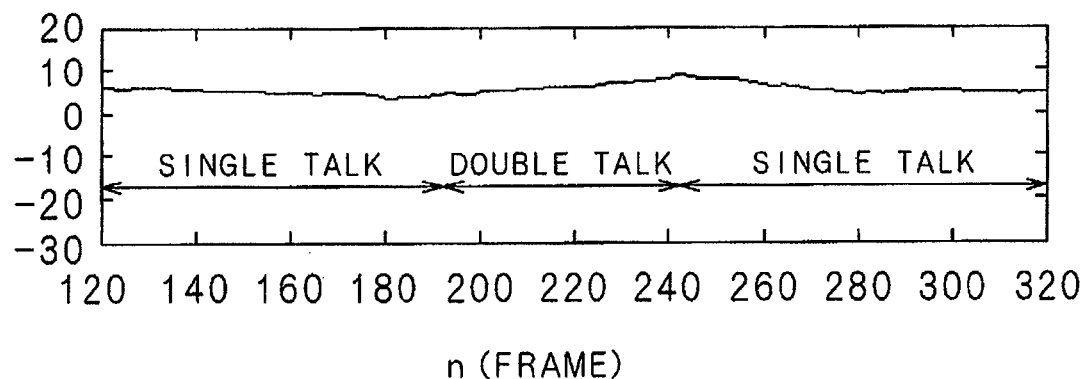
Figure 6C:
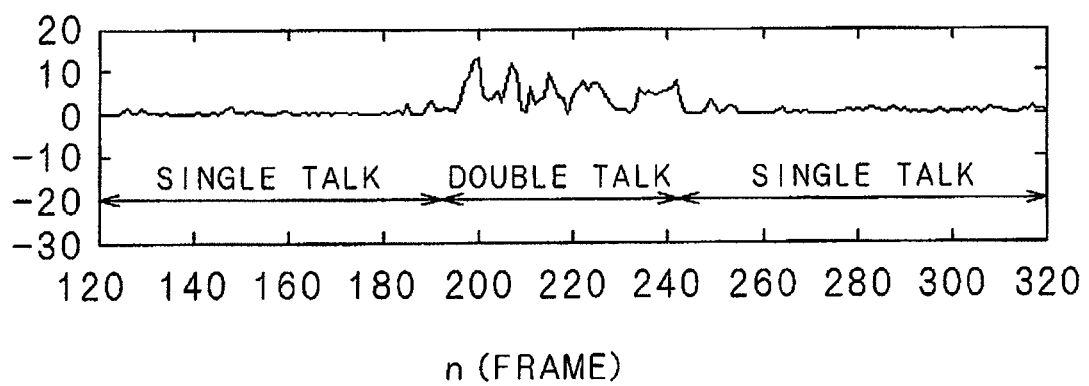

FIGS. 6A to 6C depict graphic charts illustrating examples of the change in data used in the correction amount calculating process performed by the echo suppressing apparatus 1 according to Embodiment 1. FIG. 6A is a graphic representation of the power ratio {powY(n)−powX(n)} illustrated in FIG. 5. FIG. 6B is a graph illustrating the change, for each frame, of the time average subYX(n) calculated using the formula 1, representing the change in the logarithmic power by the dB unit with the horizontal axis indicating frame numbers (n) as an indicator for time. As illustrated in FIG. 6B, the time average subYX(n) calculated using the formula 1 indicates moderate time variations in the power ratio {powY(n)−powX(n)}. The correction amount calculation section 12 calculates a power ratio Et(n) for which time variations are smoothed, by subtracting the time average subYX(n) from the power ratio {powY(n)−powX(n)} so as to eliminate the effect of the time average subYX(n) from the power ratio {powY(n)−powX(n)}. It is noted that the power ratio Et(n) for which time variations are smoothed is referred to as a smoothed power ratio powEt(n) in the description below. Here, if powEt(n) takes a negative value, the value thereof becomes 0. FIG. 6C is a graphic representation of changes in the smoothed power ratio powEt(n) for each frame, illustrating changes in the logarithmic power by the dB unit with the horizontal axis indicating frame numbers(n) as an indicator for time. As illustrated in FIG. 6C, the smoothed power ratio powEt(n) takes approximately 0 dB in the single talk zone.

Figure 7:
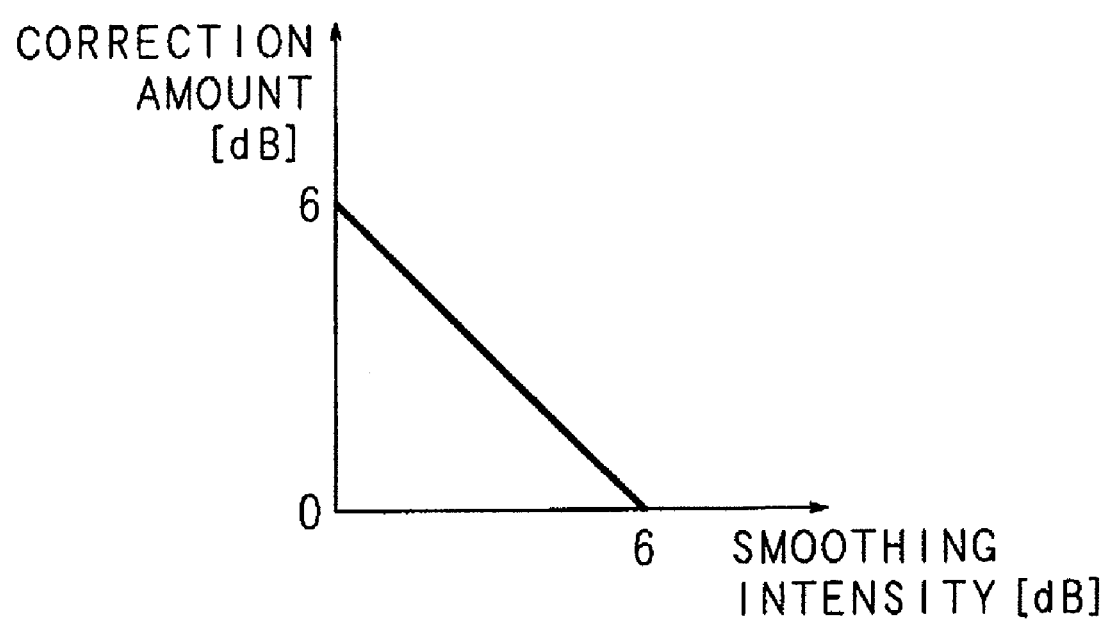
FIG. 7 is a graphic chart illustrating an example of the relationship between the smoothed power ratio and the correction amount of the echo suppressing apparatus according to Embodiment 1.

The correction amount calculation section 12 calculates the correction amount to be corrected at the correction section 11 based on the smoothed power ratio powEt(n). FIG. 7 is a graphic chart illustrating an example of the relationship between the smoothed power ratio and the correction amount of the echo suppressing apparatus 1 according Embodiment 1. FIG. 7 is a graph with the horizontal axis indicating the smoothed power ratio powEt(n) and the vertical axis indicating the correction amount, representing the relationship between them. As illustrated in FIG. 7, the correction amount is calculated such that the differential signal e(t) is suppressed in accordance with the smoothed power ratio powEt(n) when the smoothed power ratio powEt(n) is equal to or lower than a given value. In the example illustrated in FIG. 7, the correction amount in accordance with the smoothed power ratio powEt(n) is obtained when the smoothed power ratio powEt(n) is MB or lower, the correction amount increasing as the smoothed power ratio powEt(n) becomes smaller. Thus, a zone with a low smoothed power ratio powEt(n) has a high chance of being a single talk zone. Hence, the differential signal e(t) in that zone is suppressed because it is determined most likely as a residual echo.

Then the correction amount calculated at the correction amount calculation section 12 is passed to the correction section 11, which corrects the differential signal e(t) based on the received correction amount to derive a correction signal e'(t) and to output the derived correction signal e'(t) to the sound processing device 3 with a sound recognition function.

Figure 8A:
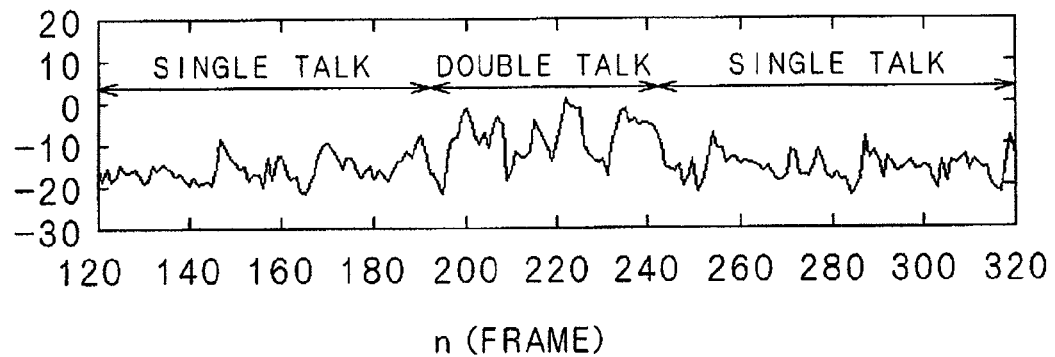
FIGS. 8A to 8C depict graphic charts illustrating examples of changes in data used in the correction amount calculating process performed by the echo suppressing apparatus according to Embodiment 1.
Figure 8B:
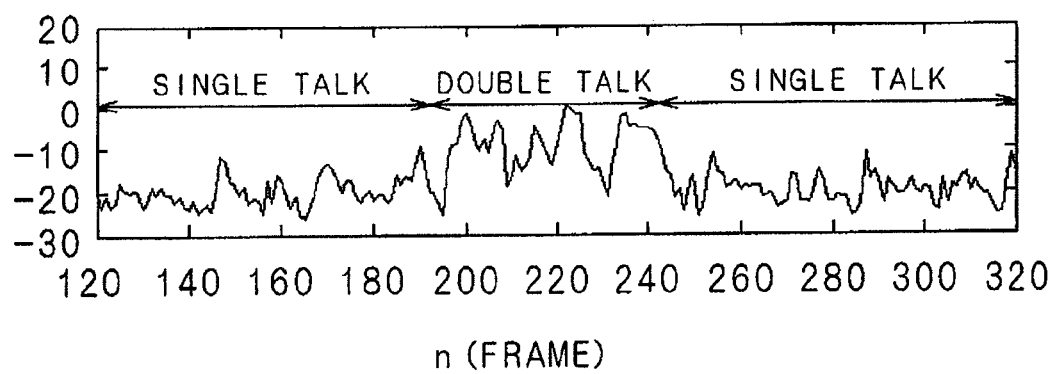
Figure 8C:
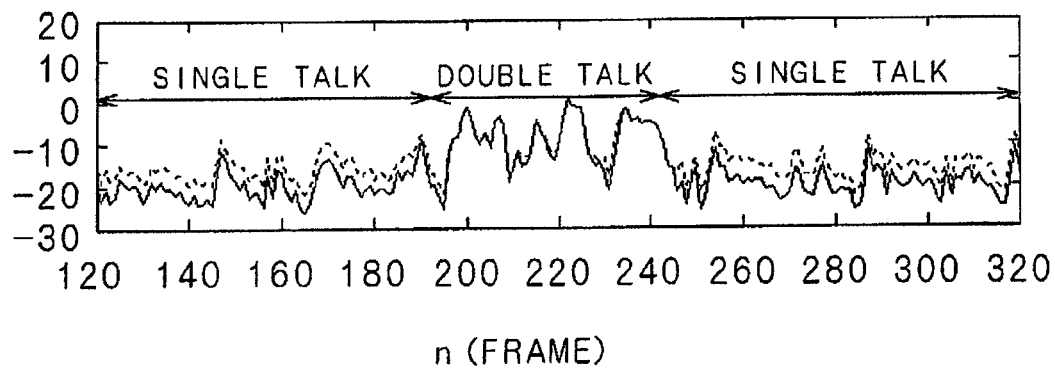

FIGS. 8A to 8C depict graphic charts illustrating examples of changes in data used in the correction amount calculating process performed by the echo suppressing apparatus 1 according to Embodiment 1. FIG. 8A is a graph illustrating changes of the logarithmic power powE(n) of the differential signal for each frame, representing changes in the logarithmic power by the dB unit with the horizontal axis indicating frame numbers (n) as an indicator for time. FIG. 8B is a graph illustrating changes of the logarithmic power powE'(t) of the correction signal for each frame, representing changes in the logarithmic power by the dB unit with the horizontal axis indicating frame numbers (n) as an indicator for time. FIG. 8C is a graph overlapping (a) with (b), with the dotted line representing FIG. 8A and the solid line representing FIG. 8B. As clearly seen in FIGS. 8A to 8C, the logarithmic power powE (n) of the differential signal is suppressed in the single talk zone by applying the signal correction method of the present embodiment.

Next, the process performed by the echo suppressing apparatus 1 with the example described above according to Embodiment 1 will be described. FIG. 9 is an operation chart illustrating an example of the signal correcting process performed by the echo suppressing apparatus 1 according to Embodiment 1. The echo suppressing apparatus 1 generates the observed sound signal y(t) based on the sound received by the sound input section 30 (at the operation S101), and calculates, by the adaptive filter 10, the differential signal e(t) obtained by removing an echo based on the output of the sound output section 20 from the observed sound signal y(t) generated by the sound input section 30 (at the operation S102).

The echo suppressing apparatus 1 executes the correction amount calculating process for calculating the correction amount by the correction amount calculation section 12 based on the reference sound signal x(t) and the observed sound signal y(t) (at the operation S103), and generates the correction signal e'(t) by correcting the differential signal e(t) using the correction section 11 based on the correction amount (at the operation S104). The echo suppressing apparatus 1 then outputs the generated correction signal e'(t) to the sound processing device 3 (at the operation S105).

Then, the sound processing device 3 executes, for example, a sound recognition process or the like based on the input correction signal e'(t).

FIG. 10 is an operation chart illustrating an example of the correction amount calculating process performed by the echo suppressing apparatus 1 according to Embodiment 1. As the correction amount calculation process, the correction amount calculation process at the operation S103 in the signal correction process explained with reference to FIG. 9 will be described in detail. The correction amount calculation section 12 in the echo suppressing apparatus 1 calculates the power ratio of the observed sound signal y(t) to the reference sound signal x(t) by dividing the observed sound signal y(t) by the reference sound signal x(t) based on control by the control circuit executing the computer program 120 stored in the storage circuit (at the operation S201). The power ratio at the operation S201 may also be calculated by subtracting the logarithmic power powX(n) of the reference sound signal x(t) from the logarithmic power powY(n) of the observed sound signal y(t).

The correction amount calculation section 12 in the echo suppressing apparatus 1 calculates the time average subYX (n) of the power ratio for which time variations in the power ratio {powY(n)−powX(n)} are smoothed (at the operation S202). The time average subYX(n) at the operation S202 is calculated using the formula 1 described above.

The correction amount calculation section 12 in the echo suppressing apparatus 1 then calculates the smoothed power ratio powE(t) by dividing the power ratio {powY(n)−powX (n)} by the time average subYX(n) (at the operation S203). The smoothed power ratio powEt(n) at the operation S203 may also be calculated by subtracting the logarithm of the time average subYX(n) from the logarithm of the power ratio {powY(n)−powX(n)}.

The correction amount calculation section 12 of the echo suppressing apparatus 1 calculates the correction amount for suppressing the differential signal e(t) in accordance with the smoothed power ratio powEt(n) when the smoothed power ratio powEt(n) is equal to or lower than a given value (at the operation S204). The calculation of the correction amount at the operation S204 is performed by calculating the correction amount which is subtracted from the differential signal e(t) in accordance with the smoothed power ratio powEt(n) when the logarithm of the smoothed power ratio powEt(n) is, for example, 6 dB or lower, based on the mathematical formula representing the relationship in the graph of FIG. 7. Thus calculated correction amount is output from the correction amount calculation section 12 to the correction section 11.

The echo suppressing method by correction as described in Embodiment 1, wherein a differential signal is corrected, is an example among countless forms of the present embodiment. The present embodiment is not limited thereto, while various other patterns such as, for example, a method of calculating the correction amount by directly correcting the observed sound signal may also be possible. The present embodiment may also employ various other patterns such as a method of calculating the correction amount from the power ratio with disregard to the time average.

Embodiment 2

Figure 11:
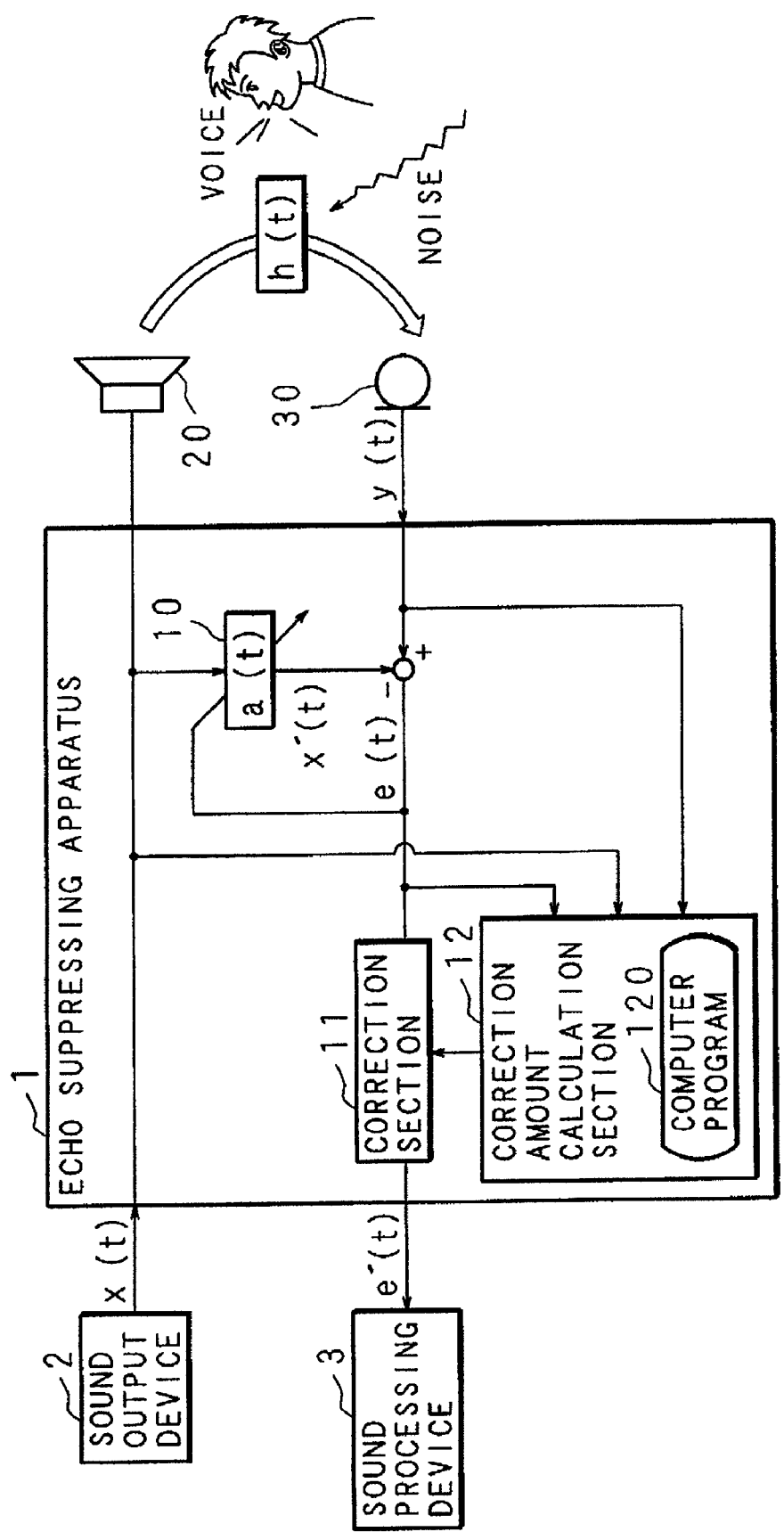
FIG. 11 is a schematic diagram illustrating an example of the echo suppressing apparatus according to Embodiment 2.

In Embodiment 2, the correction amount is calculated by a method different from that of Embodiment 1. FIG. 11 is a schematic diagram illustrating an example of the echo suppressing apparatus according to Embodiment 2. In Embodiment 2, the reference sound signal x(t), the observed sound signal y(t) and the differential signal e(t) are input to the correction amount calculation section 12. The correction amount calculation section 12 calculates, based on the smoothed power ratio powEt(n), a correction amount (correction coefficient) so as to make the spectrum shape of the differential signal e(t) smooth at the correction section 11. Specifically, it derives a spectrum from the differential signal e(t) and performs the cepstrum analysis on the derived spectrum to derive a spectrum envelope which is a low-order component, e.g. third or lower-order component. Then, a correction coefficient to be used to multiply the spectrum envelope is calculated such that the derived spectrum envelope becomes flat. It is noted that the other parts are the same as those in Embodiment 1, which are denoted by the same reference codes as Embodiment 1, while detailed description thereof will not be repeated. Since the processes up to calculation of the smoothed power ratio powEt(n) are also similar to those in Embodiment 1, they are denoted by the same reference codes as Embodiment 1 while the detailed description thereof will not be repeated.

FIG. 12 is a graph illustrating an example of the relationship between the smoothed power ratio and the correction coefficient for correcting a spectrum in the echo suppressing apparatus 1 according to Embodiment 2. FIG. 12 is a graph with the horizontal axis indicating the smoothed power ratio powEt(n) and the vertical axis indicating the correction coefficient, representing the relationship between them. As illustrated in FIG. 12, if the smoothed power ratio powE(t) is equal to or higher than a given value, the correction coefficient is 1.0. Because the correction coefficient is a coefficient to be used for multiplying the spectrum envelope, the correction amount for the spectrum envelope becomes zero when the correction coefficient is 1.0. If the smoothed power ratio powE(t) is equal to or lower than a given value, a correction coefficient to be used for multiplying the spectrum envelope is calculated such that the differential signal e(t) is suppressed in accordance with the smoothed power ratio powE(t). In the example illustrated in FIG. 12, the correction coefficient for correcting the spectrum envelope in accordance with the smoothed power ratio powE(t) is obtained when the smoothed power ratio powE(t) is equal to or lower than 5 dB, the correction coefficient becoming smaller as the smoothed power ratio powEt(n) lowers, which generates a larger correction amount. A zone with the low smoothed power ratio powEt(n) has a high chance of being a single talk zone. Thus the differential signal e(t) in that zone is suppressed such that the spectrum shape is made smooth because the differential signal e(t) therein is determined most likely as a residual echo.

Figure 13:
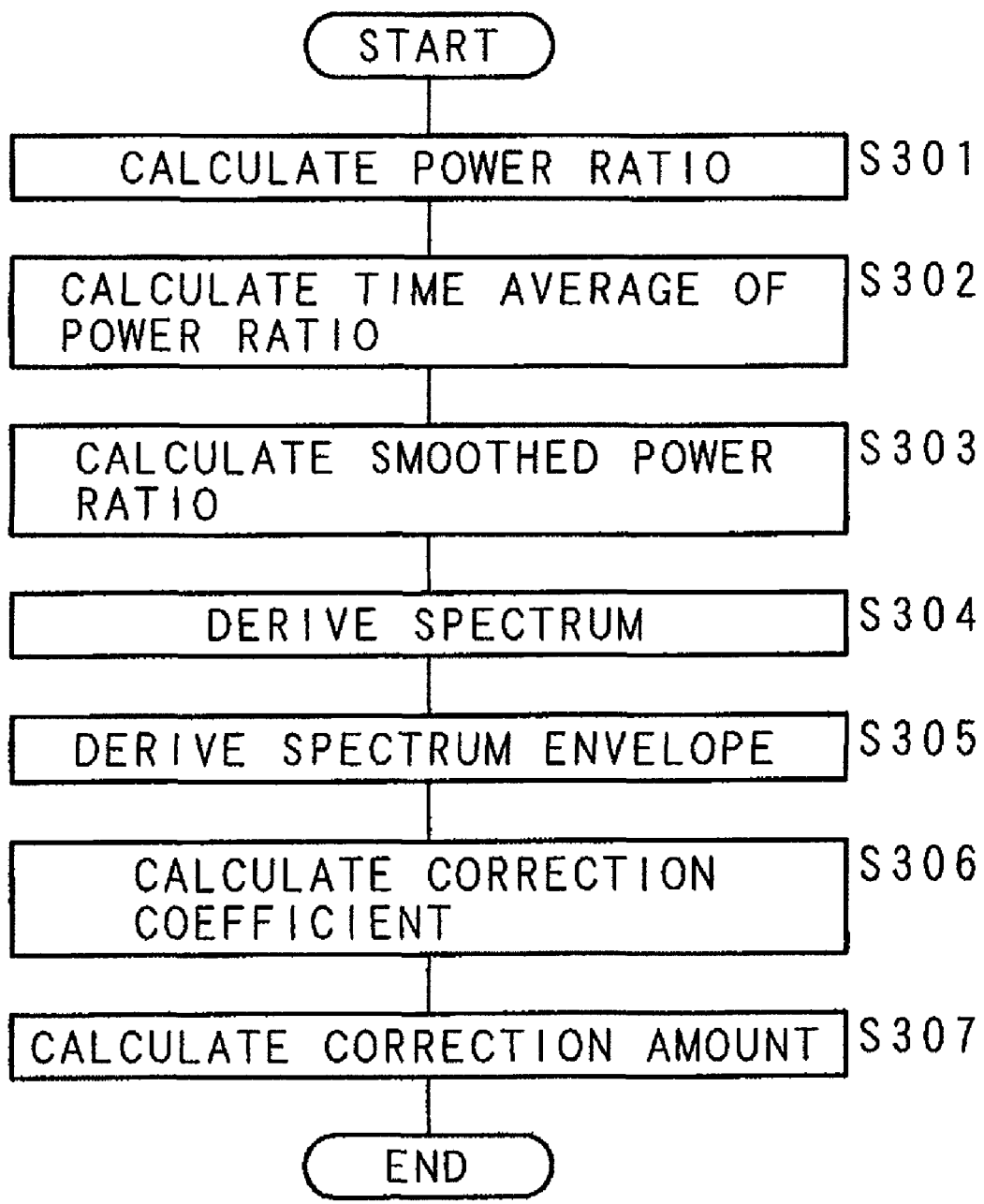
FIG. 13 is an operation chart illustrating an example of the correction amount calculating process performed by the echo suppressing apparatus according to Embodiment 2.

Next, the process performed by the echo suppressing apparatus 1 according to Embodiment 2 will be described. Since Embodiment 2 represents a variation of the correction amount calculating process in Embodiment 1, description will be made for the correction amount calculating process. FIG. 13 is an operation chart illustrating an example of the correction amount calculating process performed by the echo suppressing apparatus 1 according to Embodiment 2. The correction amount calculation section 12 in the echo suppressing apparatus 1 calculates the power ratio {powY(n)−powX(n)} of the observed sound signal y(t) to the reference sound signal x(t) by control of the control circuit executing the computer program 120 stored in the storage circuit (at the operation S301), calculates the time average subYX(n) of the power ratio for which time variations in the power ratio {powY(n)−powX(n)} are smoothed (at the operation S302), and calculates the smoothed power ratio powEt(n) by dividing the power ratio {powY(n)−powX(n)} by the time average subYX(n) (at the operation S303).

Moreover, the correction amount calculation section 12 in the echo suppressing apparatus 1 derives a spectrum from the differential signal e(t) (at the operation S304). The spectrum is derived at the operation S304 using a frequency transform function such as FFT.

The correction amount calculation section 12 in the echo suppressing apparatus 1 converts the derived spectrum into a cepstrum and performs inverse FFT on a component with lower order than a given order concerning the converted spectrum, e.g. first order or lower than third order, to derive a spectrum envelope (at the operation S305).

The process at the operation S304 is described. The spectrum |e(ω)| obtained by performing FFT on the differential signal e(t) may be represented by the following formula 2 wherein G(ω) and H(ω) indicating a higher-order FFT and a lower-order FFT, respectively, are used.

$$e(\omega)=G(\omega)H(\omega) \qquad \text{formula 2}$$

The logarithm for the formula 2 is represented by the following formula 3.

$$\log_{10}|e(\omega)|=\log_{10}|G(\omega)|+\log_{10}|H(\omega)| \qquad \text{formula 3}$$

A cepstrum c(τ) is obtained by performing IFFT (Inverse Fast Fourier Transform) on the formula 3 with the frequency ω being a variable number. It is noted that, in the formula 2, the first term on the right-hand side indicates a fine structure which is a higher-order component of the spectrum, while the second term on the right-hand side indicates the spectrum envelope which is a lower-order component of the spectrum.

The correction amount calculation section 12 in the echo suppressing apparatus 1 calculates a correction coefficient for correcting the spectrum envelope in accordance with the smoothed power ratio powEt(n) when the smoothed power ratio powEt(n) is a given value or lower (at the operation S306). The calculation of the correction coefficient at the operation S306 is performed, based on the formula representing the relationship illustrated in the graph of FIG. 12, by calculating a correction coefficient for correcting the spectrum envelope in accordance with the smoothed power ratio Et(n) when the logarithm of the smoothed power ratio powEt(n) is equal to or lower than, for example, 5 dB. It is noted that a correction coefficient may also be calculated when the smoothed power ratio powEt(n) is higher than a given value. Substantive correction, however, will not be performed here because the correction coefficient is 0.

The correction amount calculation section 12 in the echo suppressing apparatus 1 calculates a correction amount to be subtracted from the differential signal e(t) based on the product of the correction coefficient and the spectrum envelope (at the operation S307). Thus calculated correction amount is output from the correction amount calculation section 12 to the correction section 11.

Embodiment 3

In Embodiment 3, the correction amount is calculated by a method different from that of Embodiment 1. Since an example of the echo suppressing apparatus according to Embodiment 3 is similar to that in Embodiment 2 which is a variation of Embodiment 1, one may refer to Embodiments 1 and 2 for detailed description thereof, which will not be repeated here. Moreover, since the processes up to calculation of the smoothed power ratio powEt(n) are similar to those in Embodiment 1, they are denoted by the same reference codes and will not be described in detail.

In Embodiment 3, calculation using the following formula 4 is performed at the correction amount calculation section 12 for a method of smoothing changes in the logarithmic power powY(n) of the observed sound signal y(t).

$$avepowY(n)=\beta \times avepowY(n-1)+(1-\beta) \times powY(n) \quad \text{formula 4}$$

In formula 4, avepowY(n) represents the time average of the logarithmic power powY(n) of the observed sound signal y(t), whereas β represents the time constant in calculation of the time average. For the time constant β, a numeral value such as 0.95 (provided 0<β<1) is used. It is noted that avepowY(n) is referred to as a smoothed observed sound signal avepowY(n) in the description below.

Moreover, the correction amount calculation section 12 performs calculation using the following formula 5 wherein the smoothed observed sound signal avepowY(n) calculated using the formula 4 is added to the smoothed power ratio powEt(n), to obtain the smoothed power ratio powEt'(n) for which range correction is performed.

$$powEt'(n)=powEt(n)+avepowY(n) \quad \text{formula 5}$$

The formula 5 represents an operation wherein the smoothed observed sound signal avepowY(n) is added to the smoothed power ratio powEt(n). The powEt'(n) for which the range of the smoothed power ratio powEt(n) is corrected by the smoothed observed sound signal avepowY(n) may be calculated by performing the operation represented in the formula 5.

Figure 14A:
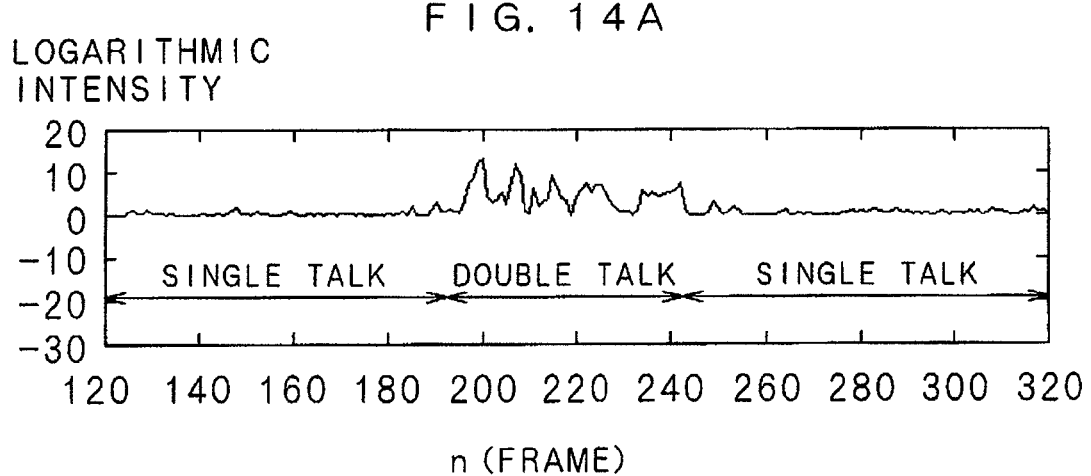
FIGS. 14A to 14C depict graphic charts illustrating examples of changes in data used in the correction amount calculating process performed by the echo suppressing apparatus according to Embodiment 3.
Figure 14B:
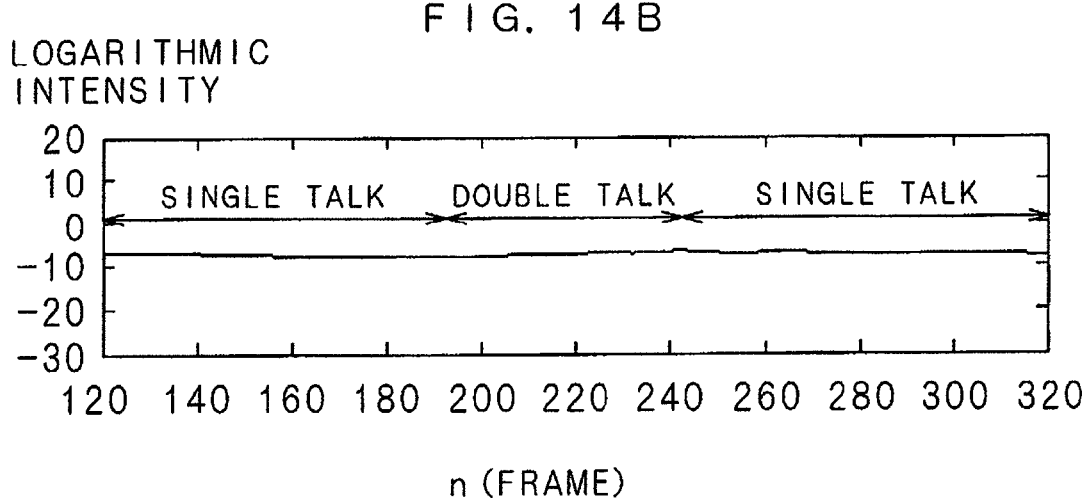
Figure 14C:
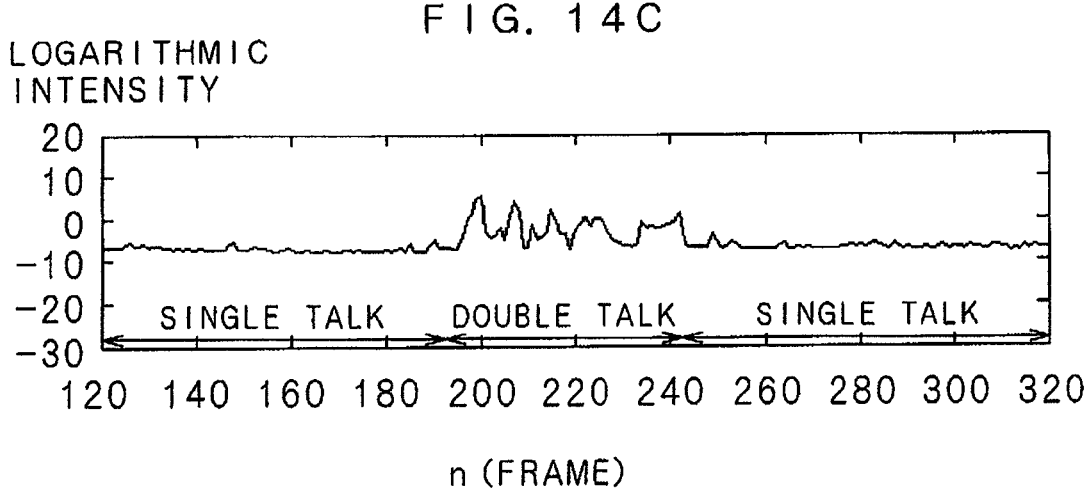

FIGS. 14A to 14C depict graphic charts illustrating examples of changes in data used in the correction amount calculating process performed by the echo suppressing apparatus 1 according to Embodiment 3. FIG. 14A is a graph representing changes in the smoothed power ratio powEt(n) for each frame, indicating changes in the logarithmic power by the dB unit with the horizontal axis taking frame numbers (n) as an indicator for time. FIG. 14B is a graph representing changes in the time average avepowY(n) calculated using the formula 4 for each frame, indicating changes in the logarithmic power by the dB unit with the horizontal axis taking frame numbers (n) as an indicator for time. FIG. 14C is a graph representing changes for each frame of powEt'(n) calculated using the formula 5, indicating changes in the logarithmic power by the dB unit with the horizontal axis taking frame numbers (n) as an indicator for time. Range correction is performed on powEt'(n) obtained by adding the smoothed observed sound signal avepowY(n) to the smoothed power ratio powEt(n), so that powEt'(n) may be used as the logarithmic power of the correction signal e'(t).

Figure 15:
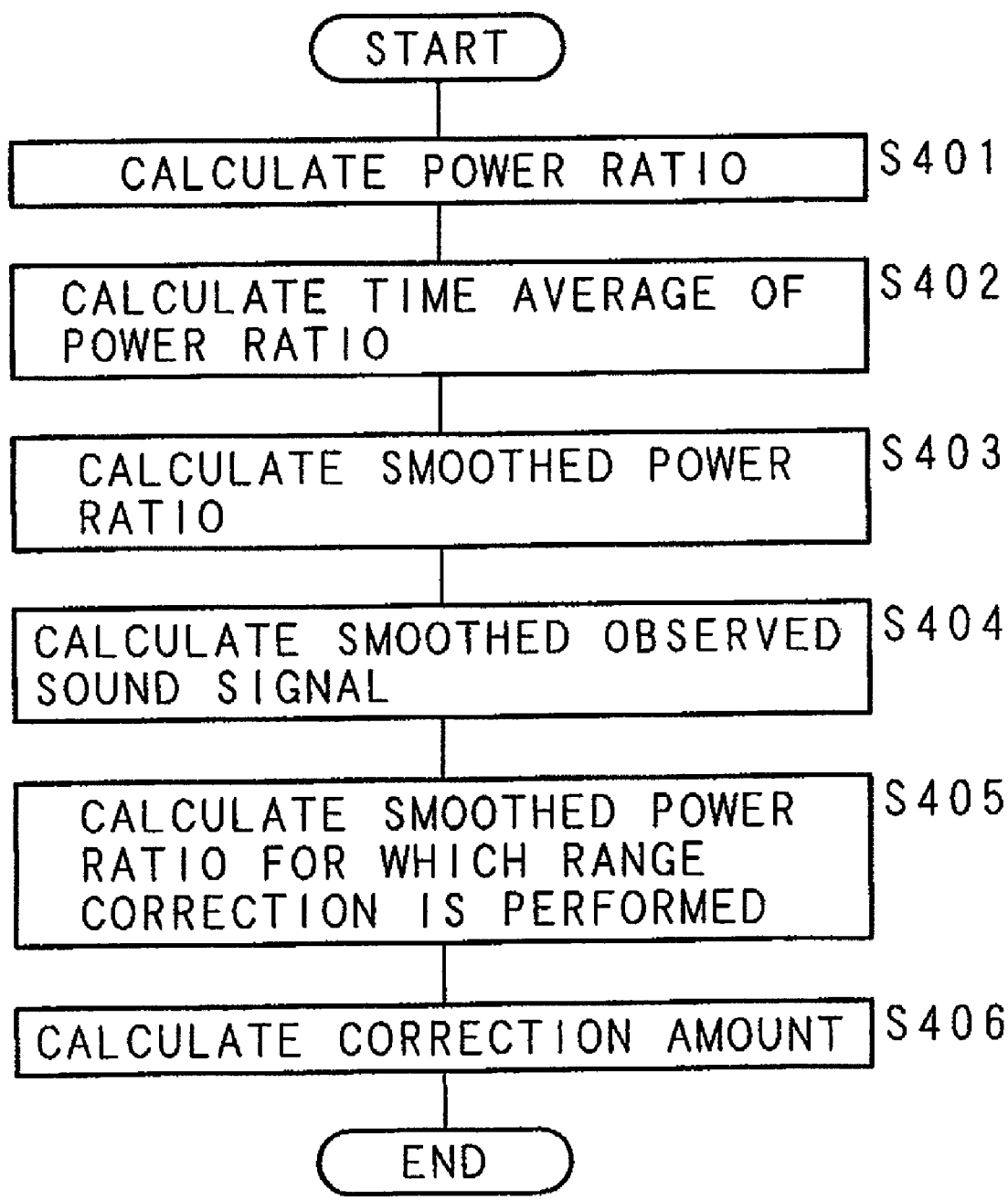
FIG. 15 is an operation chart illustrating an example of the correction amount calculating process performed by the echo suppressing apparatus according to Embodiment 3.

Next, the process performed by the echo suppressing apparatus 1 according to Embodiment 3 will be described. Since Embodiment 3 presents a variation of the correction amount calculating process in Embodiment 1, description will be made for the correction amount calculating process. FIG. 15 is an operation chart illustrating an example of the correction amount calculating process performed by the echo suppressing apparatus 1 according to Embodiment 3. The correction amount calculation section 12 in the echo suppressing apparatus 1 calculates the power ratio {powY(n)−powX(n)} of the observed sound signal y(t) to the reference sound signal x(t) by control of the control circuit executing the computer program 120 stored in the storage circuit (at the operation S401), calculates the time average subYX(n) of the power ratio for which time variations in the power ratio {powY(n)−powX(n)} are smoothed (at the operation S402), and calculates the smoothed power ratio powEt(n) by dividing the power ratio {powY(n)−powX(n)} by the time average subYX(n) (at the operation S403).

Moreover, the correction amount calculation section 12 in the echo suppressing apparatus 1 calculates the smoothed observed sound signal avepowY(n) for which time variations in the logarithmic power powY(n) of the observed sound signal y(t) are smoothed (at the operation S404). The smoothed observed sound signal avepowY(n) at the operation S404 is calculated using the formula 4 described above.

The correction amount calculation section 12 in the echo suppressing apparatus 1 calculates the smoothed power ratio powEt'(n), for which range correction is performed, by adding the smoothed observed sound signal avepowY(n) to the smoothed power ratio powEt(n) (at the operation S405). The smoothed power ratio powEt'(n) is calculated at the operation S405 using the formula 5 described above. It is noted that the smoothed observed sound signal avepowY(n) and the smoothed power ratio powEt(n) at the operation S405 represent logarithmic power, so that a multiplication is performed at the operation S405 in the operation using a positive number instead of a logarithm.

The correction amount calculation section 12 in the echo suppressing apparatus 1 then calculates a correction amount so as to correct the differential signal e(t) to powEt'(n) (at the operation S406). Thus calculated correction amount is output from the correction amount calculation section 12 to the correction section 11.

Though an example where the correction amount is calculated such that the differential signal e(t) is corrected to powEt'(n) has been described in Embodiment 3, the present embodiment is not limited thereto, while the correction signal e'(t) may be calculated based on the result obtained by weighted averaging powE(n) and powEt'(n) by a given weight.

Moreover, though the range correction is performed for the smoothed power ratio powEt(n) based on the smoothed observed sound signal avepowY(n) calculated as a time average of the logarithmic power powY(n) of the observed sound signal y(t) in Embodiment 3, the present embodiment is not limited thereto, while the range correction may also be performed based on other signals such as the time average of the logarithmic power powX(n) of the observed sound signal y(t), the logarithmic power powE(n) of the differential signal e(t) and the like.

Embodiment 4

Embodiment 4 presents an example where, in Embodiment 1, a signal is divided based on frequency bands, and a correction amount is calculated for each of the divided frequency bands. FIG. 16 is a schematic diagram illustrating an example of the echo suppressing apparatus according to Embodiment 4. The correction amount calculation section 12 in Embodiment 4 includes a dividing unit 121 for dividing the reference sound signal x(t) and the observed sound signal y(t) based on frequency bands, and a synthesizing unit 122 for synthesizing the correction amount calculated for each frequency band. Since the other parts are similar to those in Embodiment 1, they are denoted by the same reference codes as in Embodiment 1 and will not be described here.

The dividing unit 121 derives a spectrum using a frequency conversion function such as FFT for the reference sound signal x(t) and the observed sound signal y(t), divides the derived spectrum into approximately two to six signals based on frequency bands, and integrates the power spectrum for each frequency band to calculate powX(n, i) and powY(n, Here, i represents a band number indicating each frequency band. A correction amount (i) is calculated for each frequency band using the method described in Embodiment 1.

The synthesizing unit 122 then synthesizes the correction amount (i) for each frequency band to calculate the correction amount for the differential signal e(t). In synthesizing the correction amount (i) for each frequency band, a weighting factor may be set for each frequency band. For example, by setting weighting factors (0.1, 0.2, 0.3, . . . ) for respective frequency bands starting from a short wavelength band, noise which is more likely found in shorter wave length bands may be suppressed.

While implementation of Embodiments 1 to 4 described above are not limited to the respective embodiments alone, they may appropriately be practiced in combination with one another depending on circumstances.

Furthermore, Embodiments 1 to 4 are mere examples representing only a part of countless embodiments. Various types of hardware and software may be included as appropriate, while various other processes may also be combined with the basic processes described as examples.

According to the present embodiment, an echo suppressing apparatus, an echo suppressing system, an echo suppressing method and a computer program cooperate with a sound output device for outputting a sound based on a sound signal from a sound output section and a sound processing device for processing a sound signal based on the sound received by a sound input section, presume on the basis of both a reference sound signal output from the sound output device to the sound output section and an observed sound signal, remove the echo component from the observed sound signal, calculate the power ratio of the observed sound signal to the reference sound signal, obtain a correction amount for the observed sound signal from which an echo component is removed in accordance with the calculated power ratio, correct the observed sound signal from which the echo component is removed in accordance with the obtained correction amount, and output the corrected observed sound signal to the sound processing device.

Thus, according to the present embodiment, when a speaker's voice is received under the environment, for example, where music is being output based on the reference sound signal the power of the observed sound signal presents time variations similar to those of the power of the reference sound signal in a state called single talk in which no speaker is talking, making it possible to presume whether or not it is in the single talk state based on the power ratio. Therefore, the observed sound signal from which the echo component is removed may appropriately be corrected, so that a residual echo may be removed, thus presenting a beneficial effect.

Moreover, in a method of correcting on the basis of the power ratio according to the present embodiment, the correction amount is calculated based on the result obtained by suppressing the observed sound signal in accordance with the power ratio when the power ratio is equal to or lower than a given value. Generally, the power ratio is smaller in the single talk state compared to that in the double talk state. According to the present embodiment, in view of such a characteristic, the observed sound signal is suppressed in accordance with the power ratio to reduce the power of the residual echo in a zone regarded as the single talk state, so that an echo may be removed, presenting a beneficial effect.

In a method of correcting on the basis of the power ratio according to the present embodiment, the correction amount for correcting the spectrum shape of the observed sound signal is calculated. Specifically, the method derives a spectrum based on the observed sound signal, derives a spectrum envelope based on the derived spectrum, calculates the correction coefficient for correcting the spectrum envelope in accordance with the power ratio, and calculates the correction amount for correcting the spectrum shape of the observed sound signal based on the result obtained by correcting the spectrum envelope with the correction coefficient.

In the present embodiment, this presents a beneficial effect such that the spectrum envelope is corrected to eliminate the effects caused by moderate time variations in the spectrum in a zone regarded as the single talk state with the power ratio of a given value or lower, thus eliminating the effects caused by a residual echo in the zone regarded as the single talk state.

According to the present embodiment, time variations in the acoustic field in the external environment may be evened out by dividing a power ratio by the power ratio for which time variations are smoothed, presenting a beneficial effect such that the correction amount may be calculated by a certain operation process regardless of time variations in the acoustic field in the external environment. Hence, if it is applied to a car navigation system, for example, the effects caused by time variations in the acoustic field in the external environment such as change of road noise while driving or change of playing music may be suppressed so that the residual echo may be removed, presenting a beneficial effect.

Furthermore, according to the present embodiment, the correction amount is calculated for each frequency band of the observed sound signal and the reference sound signal and is calculated by multiplying the calculated correction amount for each frequency band by a band correction coefficient which is preset for each frequency band, so that emphasis and suppression may be possible for each frequency band as required, thus presenting a beneficial effect such that, for example, a process of reducing the weight of a low frequency band which is more easily affected by an echo may be performed.

What is claimed is:

1. An echo suppressing apparatus operable with a sound output device for outputting sound based on a reference sound signal and a sound processing device for processing an observed sound signal based on a received sound, the echo suppressing apparatus comprising:
  an echo removal section for presuming an echo component of the observed sound signal on the basis of both the observed sound signal and the reference sound signal, and removing the echo component from the observed sound signal;
  a ratio calculation section for calculating a power ratio of the observed sound signal to the reference sound signal;
  a correction amount calculation section for calculating, based on with the calculated power ratio, a correction amount for the observed sound signal from which the echo component is removed;
  a correction section for correcting, based on the calculated correction amount, the observed sound signal from which the echo component is removed, so as to suppress a residual echo remaining in the observed sound signal from which the echo component is removed; and
  an output section for outputting the corrected observed sound signal to the sound processing device, wherein the correction amount calculation section comprises:
  a derivation section for deriving a spectrum based on the observed sound signal from which the echo component is removed;
  an envelope derivation section for deriving a spectrum envelope based on the derived spectrum; and
  a coefficient section for obtaining a correction coefficient for correcting the spectrum envelope in accordance with the power ratio when the power ratio is equal to or lower than a given value, and
  the correction amount calculation section calculates a correction amount for correcting a spectrum shape of the observed sound signal from which the echo component is removed in the basis of the result obtained by correcting the spectrum envelope with the correction coefficient.

2. The echo suppressing apparatus according to claim 1, wherein the correction amount calculation section calculates a correction amount such that the residual echo of the observed sound signal is suppressed in accordance with the power ratio, when the power ratio is equal to or lower than a given value.

3. The echo suppressing apparatus according to claim 2, wherein the correction amount calculation section calculates a correction amount based on the result obtained by smoothing time variation in the power ratio.

4. The echo suppressing apparatus according to claim 3, wherein the correction amount calculation section calculates a correction amount for each frequency band fix the observed sound signal and the reference sound signal, and calculates a correction amount by multiplying the correction amount calculated for each frequency band by a band correction coefficient which is preset for each frequency band.

5. The echo suppressing apparatus according to claim 3, the correction amount calculation section calculates a correction amount for each frequency band for the observed sound signal and the reference sound signal, and calculates a correction amount by multiplying the correction amount calculated for each frequency band by a band correction coefficient which is preset for each frequency band.

6. The echo suppressing apparatus according to claim 2, wherein the correction amount calculation section calculates a correction amount for each frequency band for the observed sound signal and the reference sound signal, and calculates a correction amount by multiplying the correction amount calculated for each frequency band by a band correction coefficient which is preset for each frequency band.

7. The echo suppressing apparatus according to claim 2, wherein the correction amount calculation section calculates a correction amount for each frequency band for the observed sound signal and the reference sound signal, and calculates a correction amount by multiplying the correction amount calculated for each frequency band by a band correction coefficient which is preset for each frequency band.

8. The echo suppressing apparatus according to claim 1, wherein the correction amount calculation section calculates a correction amount based on the result obtained by smoothing time variation in the power ratio.

9. The echo suppressing apparatus according to claim 8, wherein the correction amount calculation section calculates a correction amount for each frequency band for the observed sound signal and the reference sound signal, and calculates a correction amount by multiplying the correction amount calculated for each frequency band by a band correction coefficient which is preset for each frequency band.

10. The echo suppressing apparatus according to claim 8, wherein the correction amount calculation section calculates a correction amount for each frequency band for the observed sound signal and the reference sound signal, and calculates a correction amount by multiplying the correction amount calculated for each frequency band by a band correction coefficient which is preset for each frequency band.

11. The echo suppressing apparatus according to claim 1, wherein the correction amount calculation section calculates a correction amount for each frequency band for the observed sound signal and the reference sound signal, and calculates a correction amount by multiplying the correction amount calculated for each frequency band by a band correction coefficient which is preset for each frequency band.

12. The echo suppressing apparatus according to claim 1, wherein the correction amount calculation section calculates a correction amount for each frequency band for the observed sound signal and the reference sound signal, and calculates a correction amount by multiplying the correction amount calculated for each frequency band by a band correction coefficient which is preset for each frequency band.

13. An echo suppressing system, comprising:
  a sound output device for outputting a sound based on a reference sound signal;
  a sound processing device for processing a observed sound signal based on a received sound; and
  an echo suppressing apparatus for suppressing a echo component of the observed sound signal, wherein the echo suppressing apparatus comprises:
    an echo removal section for presuming an echo component of the observed sound signal on the basis of both the observed sound signal and the reference sound signal, and removing the echo component from the observed sound signal;
    a ratio calculation section for calculating a power ratio of the observed sound signal to the reference sound signal;
    a correction amount calculation section for calculating, in accordance with the calculated power ratio, a correction amount for the observed sound signal from which the echo component is removed;
    a correction section for correcting, based on the calculated correction amount, the observed sound signal from which the echo component is removed, so as to suppress a residual echo remaining in the observed sound signal from which the echo component is removed; and
    an output section for outputting the corrected observed sound signal to the sound processing device, wherein the correction amount calculation section comprises:
a derivation section for deriving a spectrum based on the observed sound signal from which the echo component is removed;
an envelope derivation section for deriving a spectrum envelope based on the derived spectrum; and
a coefficient section for obtaining a correction coefficient for correcting the spectrum envelope in accordance with the power ratio when the power ratio is equal to or lower than a given value, and
the correction amount calculation section calculates a correction amount for correcting a spectrum shape of the observed sound signal from which the echo component is removed in the basis of the result obtained by correcting the spectrum envelope with the correction coefficient.

14. An echo suppressing method for making an echo suppressing apparatus operable with a sound output device for outputting sound based on a reference sound and a sound processing device for processing a observed sound signal based on a received sound, suppress an echo of the observed sound signal, the echo suppressing method comprising:
presuming an echo component of the observed sound signal on the basis of both the observed sound signal and the reference sound signal output from the sound output device;
removing the echo component from the observed sound signal;
calculating a power ratio of the observed sound signal to the reference sound signal;
calculating, in accordance with the calculated power ratio, a correction amount for the observed sound signal from which the echo component is removed, wherein said calculating of the correction amount is performed by a correction amount calculation section;
correcting, based on the calculated correction amount, the observed sound signal from which the echo component is removed, so as to suppress a residual echo remaining in the observed sound signal from which the echo component is removed; and
outputting the corrected observed sound signal to the sound processing device, wherein
the correction amount calculation section comprises:
a derivation section for deriving a spectrum based on the observed sound signal from which the echo component is removed;
an envelope derivation section for deriving a spectrum envelope based on the derived spectrum; and
a coefficient section for obtaining a correction coefficient for correcting the spectrum envelope in accordance with the power ratio when the power ratio is equal to or lower than a given value, and
the correction amount calculation section calculates a correction amount for correcting a spectrum shape of the observed sound signal from which the echo component is removed in the basis of the result obtained by correcting the spectrum envelope with the correction coefficient.

15. A computer-readable recording medium recording a program is recorded for making the computer operable with a sound output device for outputting sound based on a reference sound signal and a sound processing device for processing a observed sound signal based on a received sound, calculate a correction amount for correcting the observed sound signal, the program comprising:
presuming a echo component of the observed sound signal on the basis of both the observed sound signal and the reference sound signal;
removing the echo component from the observed sound signal;
calculating a power ratio of the observed sound signal to the reference sound signal; and
calculating, in accordance with the calculated power ratio, a correction amount for the observed sound signal from which the echo component is removed, wherein said calculating of the correction amount is performed by a correction amount calculation section, wherein
the correction amount calculation section comprises;
a derivation section for deriving a spectrum based on the observed sound signal from which the echo component is removed;
an envelope derivation section for deriving a spectrum envelope based on the deriv ed spectrum; and
a coefficient section for obtaining correction coefficient for correcting the spectrum envelope in accordance with the power ratio when the power ratio is equal to or lower than a given value, and
the correction amount calculation section calculates a correction amount for correcting a spectrum shape of the observed sound signal from which the echo component is removed in the basis of the result obtained by correcting the spectrum envelope with the correction coefficient.

* * * * *